(12) United States Patent
Higgins et al.

(10) Patent No.: US 9,501,201 B2
(45) Date of Patent: Nov. 22, 2016

(54) SYSTEM AND METHOD OF MODIFYING A USER EXPERIENCE BASED ON PHYSICAL ENVIRONMENT

(71) Applicants: Krystal Rose Higgins, Sunnyvale, CA (US); Eric J. Farraro, San Jose, CA (US); John Tapley, Santa Clara, CA (US)

(72) Inventors: Krystal Rose Higgins, Sunnyvale, CA (US); Eric J. Farraro, San Jose, CA (US); John Tapley, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 322 days.

(21) Appl. No.: 13/769,499

(22) Filed: Feb. 18, 2013

(65) Prior Publication Data

US 2014/0237400 A1 Aug. 21, 2014

(51) Int. Cl.
*G06F 3/048* (2013.01)
*G06F 9/44* (2006.01)

(52) U.S. Cl.
CPC ............. *G06F 3/048* (2013.01); *G06F 9/4443* (2013.01)

(58) Field of Classification Search
CPC ......... G06F 3/048; G06F 1/24; H04N 5/222; G08B 21/00; H04B 1/38
See application file for complete search history.

(56) References Cited

U.S. PATENT DOCUMENTS

| | | | |
|---|---|---|---|
| 6,567,104 B1* | 5/2003 | Andrew et al. | 715/762 |
| 8,111,267 B2* | 2/2012 | Ham et al. | 345/646 |
| 2002/0160817 A1* | 10/2002 | Salmimaa et al. | 455/566 |
| 2003/0046401 A1* | 3/2003 | Abbott et al. | 709/228 |
| 2004/0128127 A1* | 7/2004 | Kemp et al. | 704/225 |
| 2006/0107219 A1* | 5/2006 | Ahya et al. | 715/745 |
| 2008/0036591 A1* | 2/2008 | Ray | 340/540 |
| 2008/0168267 A1* | 7/2008 | Bolen et al. | 713/100 |
| 2009/0106655 A1* | 4/2009 | Grant et al. | 715/702 |
| 2009/0167701 A1* | 7/2009 | Ronkainen | 345/173 |
| 2009/0309711 A1* | 12/2009 | Adappa et al. | 340/501 |
| 2010/0013761 A1* | 1/2010 | Birnbaum et al. | 345/156 |
| 2010/0016014 A1* | 1/2010 | White | 455/556.1 |
| 2010/0144308 A1* | 6/2010 | Jin et al. | 455/404.1 |
| 2010/0161215 A1* | 6/2010 | Karani | 701/204 |
| 2011/0054776 A1* | 3/2011 | Petrov et al. | 701/201 |
| 2012/0081337 A1* | 4/2012 | Camp, Jr. | G06F 3/0436 345/177 |
| 2012/0197728 A1* | 8/2012 | Luna et al. | 705/14.64 |
| 2013/0120630 A1* | 5/2013 | Kim et al. | 348/333.01 |
| 2013/0214939 A1* | 8/2013 | Washlow et al. | 340/901 |

\* cited by examiner

*Primary Examiner* — Rashawn Tillery
(74) *Attorney, Agent, or Firm* — Schwegman, Lundberg & Woessner, P.A.

(57) ABSTRACT

A method of dynamically altering a user interface on an electronic device is provided. A user interface is presented to a user, wherein the user interface includes one or more elements. Then, a first aspect of a physical environment of the electronic device is determined. One or more elements of the user interface can then be dynamically modified based on the determined first aspect of the physical environment of the electronic device.

17 Claims, 9 Drawing Sheets

SYSTEM AND METHOD OF MODIFYING A USER EXPERIENCE BASED ON PHYSICAL ENVIRONMENT

BACKGROUND

User experience is a broad term covering many aspects of users' experiences with computing products or services accessed through computing products (such as web sites). The user experience includes not only the user interface, but also the graphics and physical interaction. For the most part, such a user experience is somewhat static in nature. The layout of an application on a smartphone, for example, is generally the same for most or all users who access the application, regardless of the physical environment in which the application is being used. There are factors, however, that can affect the user's ability to interact with such a user experience. Cold temperatures, for example, can make it difficult to use a touchscreen application due to shaking or numb fingers or the use of gloves. While certain gloves have been designed that are "touch-sensitive," in that a touchscreen device can detect location of the glove despite the absence of an actual finger touching the screen, these gloves still result in an ultimate footprint of the "touch" being larger than the user's finger.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

In an example embodiment, various aspects of a user experience are dynamically altered in order to provide a customized and efficient experience for the user, based on the physical environment. In an example embodiment, temperature of the physical environment of a user device is taken into account, and the user experience is modified based on this temperature. Elements within a user interface, such as button size, advertising sizing, font, color, placement, the presences of certain interface objects, etc., can all be dynamically altered based on this physical environment information as well as other factors (e.g., demographic information, information from user profiles, etc.). For example, a search bar displayed in an application may change in size and location on the screen of a touchscreen device based on the current temperature at the current location of the touchscreen device. In an extreme embodiment, all elements but the search bar may be removed when the temperature is extremely cold, reducing the user interface to its bare minimum elements.

Figure 1:
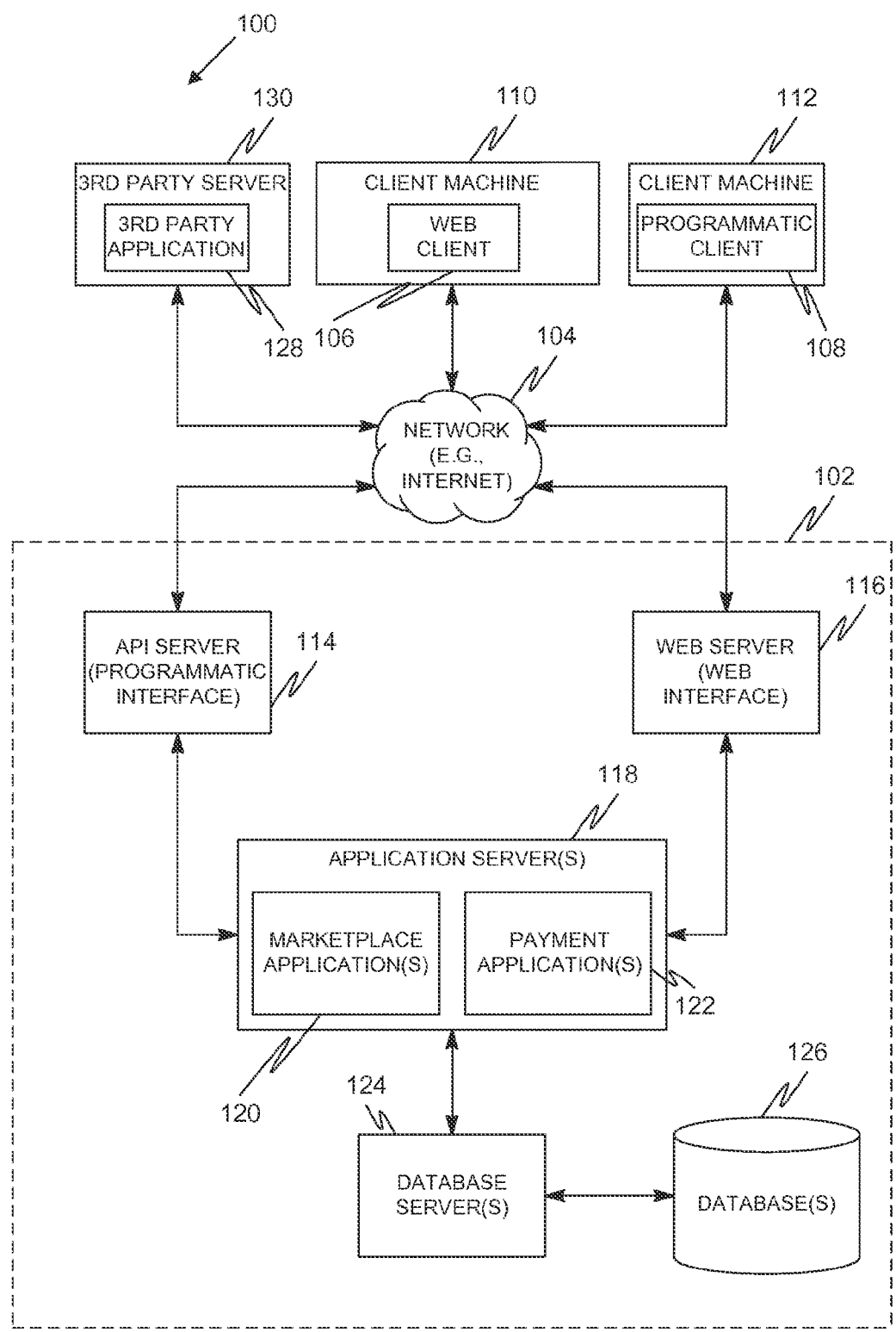
FIG. 1 is a network diagram depicting a client-server system within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present disclosure is of course not limited to such an architecture, and may equally well find application in a distributed, or peer-to-peer, architecture system, for example. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
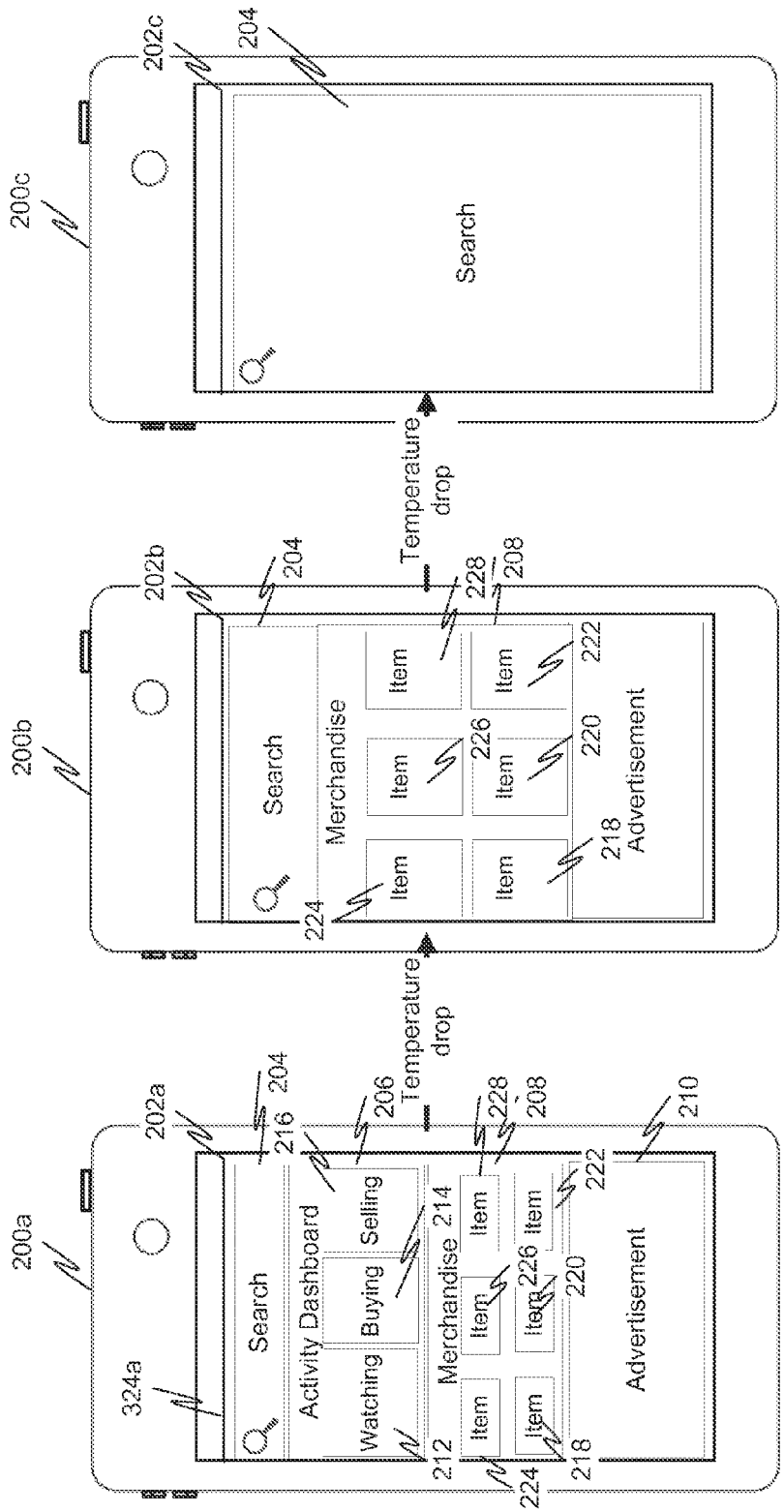
FIG. 2 is a diagram illustrating a progression, in accordance with an example embodiment, of dynamic alteration of a user interface based on temperature.

FIG. 2 is a diagram illustrating a progression, in accordance with an example embodiment, of dynamic alteration of a user interface based on temperature. Pictured here are a mobile device 200*a*, 200*b*, 200*c* in three states. It should be noted that while a mobile device is depicted, a similar process could run on any electronic device. Beginning with the mobile device 200*a* in the first state, it can be seen that the user interface 202*a* has various sections, including a search bar 204, an activity dashboard 206, a merchandise area 208, and an advertisement 210. For discussion purposes, this may be referred to as a default or beginning layout, although since the methods described herein are dynamically applied, there need not be any state that is strictly known as a default or beginning layout because the layout may simply be continuously adjusted. The user interface 202*a* here may depict an interface to an online auction web site, although one of ordinary skill in the art will recognize that this disclosure can apply to other types of user interfaces as well.

Within the activity dashboard 206 are three activities: watching 212 (for items in the online auction the user has selected as being of interest), buying 214 (for items in the online auction the user has bid on), and selling 216 (for items in the online auction the user is selling).

Within the merchandise area 208 may be a number of buttons 218, 220, 222, 224, 226, 228.

Turning to mobile device 200*b*, which is in the second state, the temperature of the environment surrounding the mobile device 200*b* has fallen below a predetermined threshold. The system may track this temperature change and adjust the user interface 202*b* to better align with the temperature. Specifically, the size of the search bar 204 may be increased, and the buttons 218-224 in the merchandise area 208 may be increased in size, making it easier for the user to select these items with a shivering, numb, or gloved finger. In order to compensate for the increase in size of these elements, the activity dashboard 206 has been eliminated Turning to mobile device 200*c*, which is in the third state, the temperature of the environment surrounding the mobile device 200*c* has fallen even more, past a further threshold. This temperature decrease may be so extreme that the system may decide to reduce the user interface 202*c* to its barest minimum element, namely the search bar 204, which here has been increased in size to fill the entire user interface 202*c*.

In the example embodiments where temperature is used as the physical environmental factor affecting the user experience, the temperature may be retrieved in a number of different ways. In one example embodiment, a location of a mobile device is obtained via, for example, global positioning system (GPS) information from a GPS module located in the mobile device. Alternatively, the location may be deduced using other information, such as Internet Protocol (IP) address, cell phone tower proximity or triangulation, or express user interaction (e.g., the user informs the application of the location). A temperature corresponding to the location may then be retrieved from a weather server, which may provide a current temperature for the user's location. In some embodiments, it may be appropriate to distinguish between when the user device is indoors or outdoors. For example, wintertime outside in Minneapolis may be −10 degrees Fahrenheit, but inside in the same city the temperature may be 70 degrees Fahrenheit. While the GPS information may be precise enough to determine whether the user is inside or outside, there may be instances where it is borderline (such as if the user is near an exit, or due to GPS interference). In such cases, other factors may be used to help determine whether the mobile device is inside or outside, such as ambient light levels or information received from a microphone on the mobile device (e.g., crickets chirping, traffic sounds, or wind noise may all be indicative of being outside).

Other mechanisms to detect temperature may also be used. In some example embodiments, a thermometer is embedded in a mobile device, and the thermometer may be accessed directly to obtain the local temperature.

Additionally, it is not just cold temperatures that may affect the user experience. In some embodiments, hot temperatures may also result in the system deciding to alter the user interface or other elements. When temperatures exceed 90 or 100 degrees Fahrenheit, for example, it is quite common for users' hands to get sweaty, and the sweat can interfere with a touchscreen's ability to accurately detect user position. As such, the same types of user interface modifications described above with respect to cold temperatures may also apply to extremely hot temperatures as well.

Furthermore, while the above embodiments describe altering the visual user interface itself in response to the physical environment, other aspects of the user experience can be altered in lieu of or in conjunction with the visual user interface.

Figure 3:
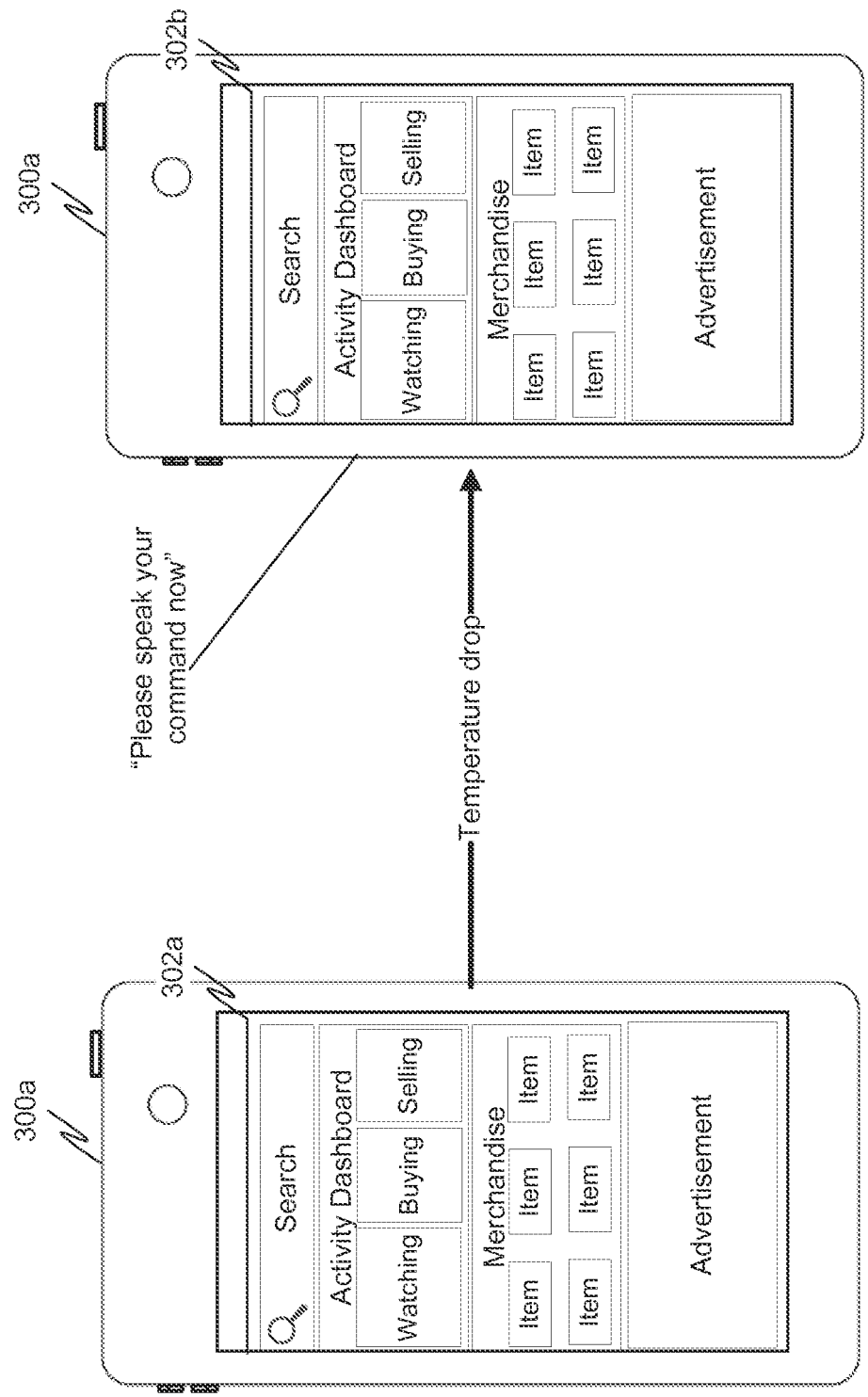
FIG. 3 is a diagram illustrating a progression, in accordance with another example embodiment, of dynamic alteration of a user experience.

FIG. 3 is a diagram illustrating a progression, in accordance with another example embodiment, of dynamic alteration of a user experience. Here, depicted are two states of the mobile device 300*a*, 300*b*. The user interface 302*a* may be identical to the user interface 302*b*, but in the presence of a lower temperature, the mobile device 300*b* has automatically activated a voice recognition service, which allows the user to speak commands as opposed to, or in conjunction with, touch input.

Figure 4:
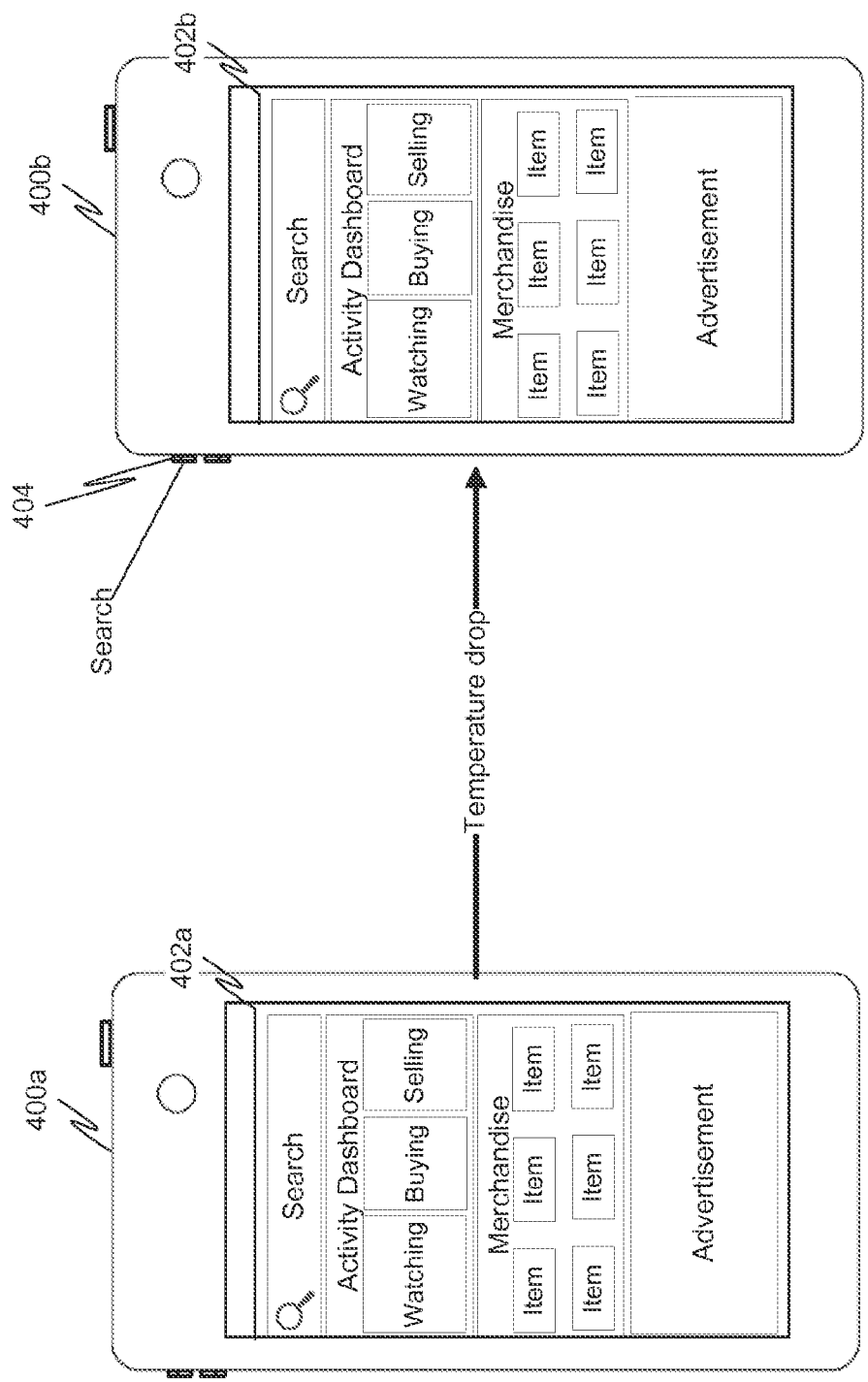
FIG. 4 is a diagram illustrating a progression, in accordance with another example embodiment, of dynamic alteration of a user experience.

FIG. 4 is a diagram illustrating a progression, in accordance with another example embodiment, of dynamic alteration of a user experience. Here, depicted are two states of the mobile device 400*a*, 400*b*. The user interface 402*a* may be identical to the user interface 402b, but in the presence of a lower temperature, the mobile device 400b has automatically altered a mapping of a physical button 404 to operate one of the functions of the user interface, Here, the physical button 404, which ordinarily may be used to raise a volume level of the mobile device, is automatically switched to activate a search function of a user interface.

Other changes in response to the physical environment may also be implemented. In one example embodiment, a mobile device, upon detecting a low surrounding temperature, can activate a haptic mode of the mobile device, which provides tactile feedback for touch input through the use of for example, vibrations. This can be helpful when fingers are numb and a user may not ordinarily be able to detect whether or not he or she is actually pressing a touchscreen.

In another example embodiment, a mobile device, upon detecting a low surrounding temperature, can take active steps to raise the temperature of the mobile device. This may include, for example, increasing the brightness of the screen, running a central processing unit (CPU) at maximum levels, and taking other steps to heat up the mobile device itself.

Other parameters of a physical environment can also be used to dynamically alter the user experience. Humidity, sun position, sunrise and sunset times, and other parameters that can be obtained from a weather server can also be used. Additionally, other factors, such as ambient noise and location can be utilized as well. With respect to ambient noise, for example, a mobile device could dynamically place itself into a vibrate mode and/or a non-voice recognition mode when the ambient noise becomes too great, as the user may not be able to hear a ringer in such an environment or be able to speak voice commands that could be understood.

Figure 5:
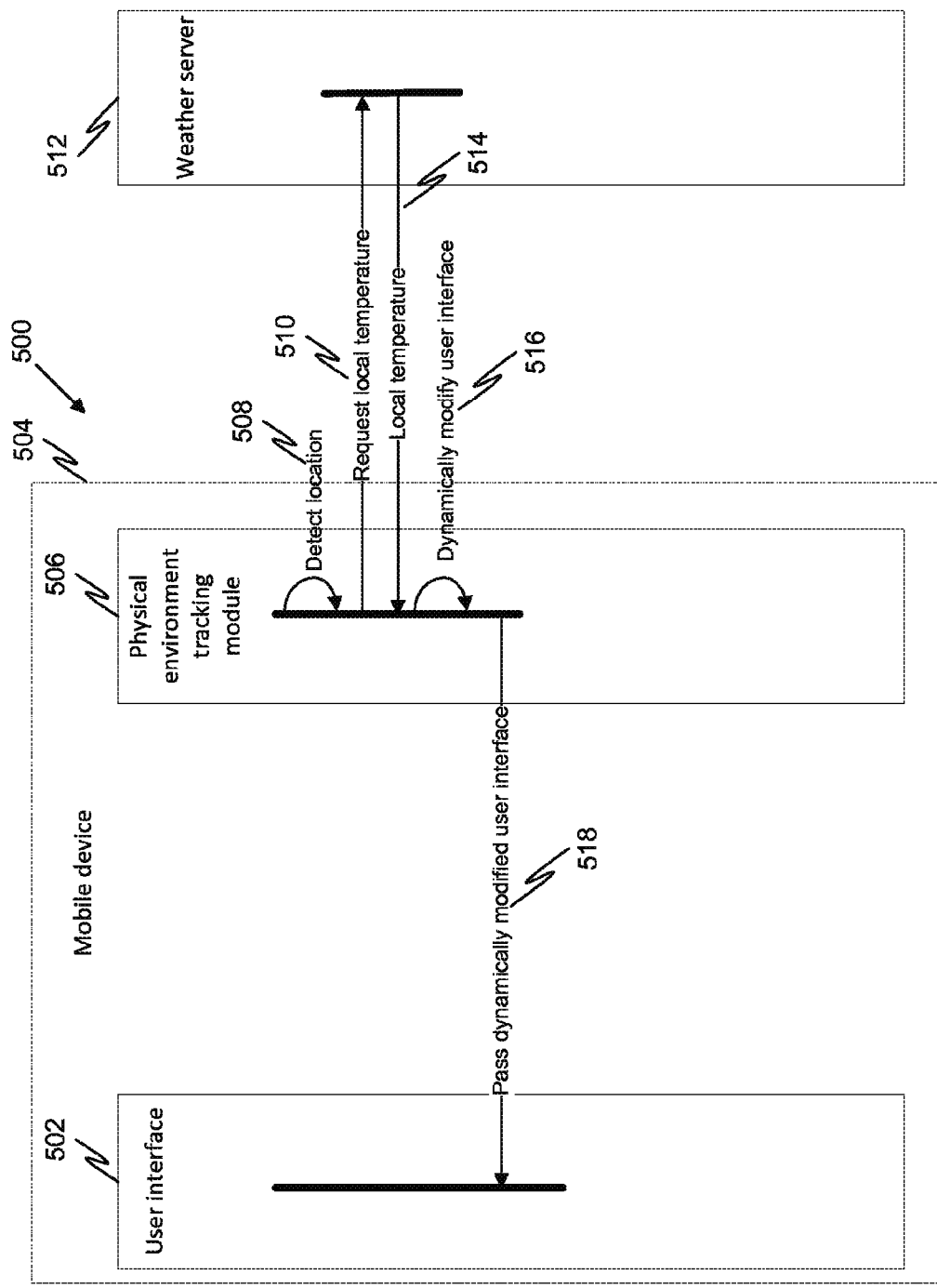
FIG. 5 is an interaction diagram illustrating a method, in accordance with an example embodiment, of dynamically altering a user interface.

FIG. 5 is an interaction diagram illustrating a method 500, in accordance with an example embodiment, of dynamically altering a user interface. In this method 500, a user interface 502, which may be contained on a mobile device 504, interacts with a physical environment tracking module 506, also located on the mobile device 504. At operation 508, the physical environment tracking module 506 detects a location of the mobile device 504, and then at operation 510 requests a local temperature for this location from a weather server 512. The weather server 512 returns the temperature at operation 514. The physical environment tracking module 506 then determines that the local temperature passes a predetermined threshold and dynamically modifies the user interface 502 based on this local temperature at operation 516, and then at operation 518 passes the dynamically modified user interface to the user interface 502 for display.

Figure 6:
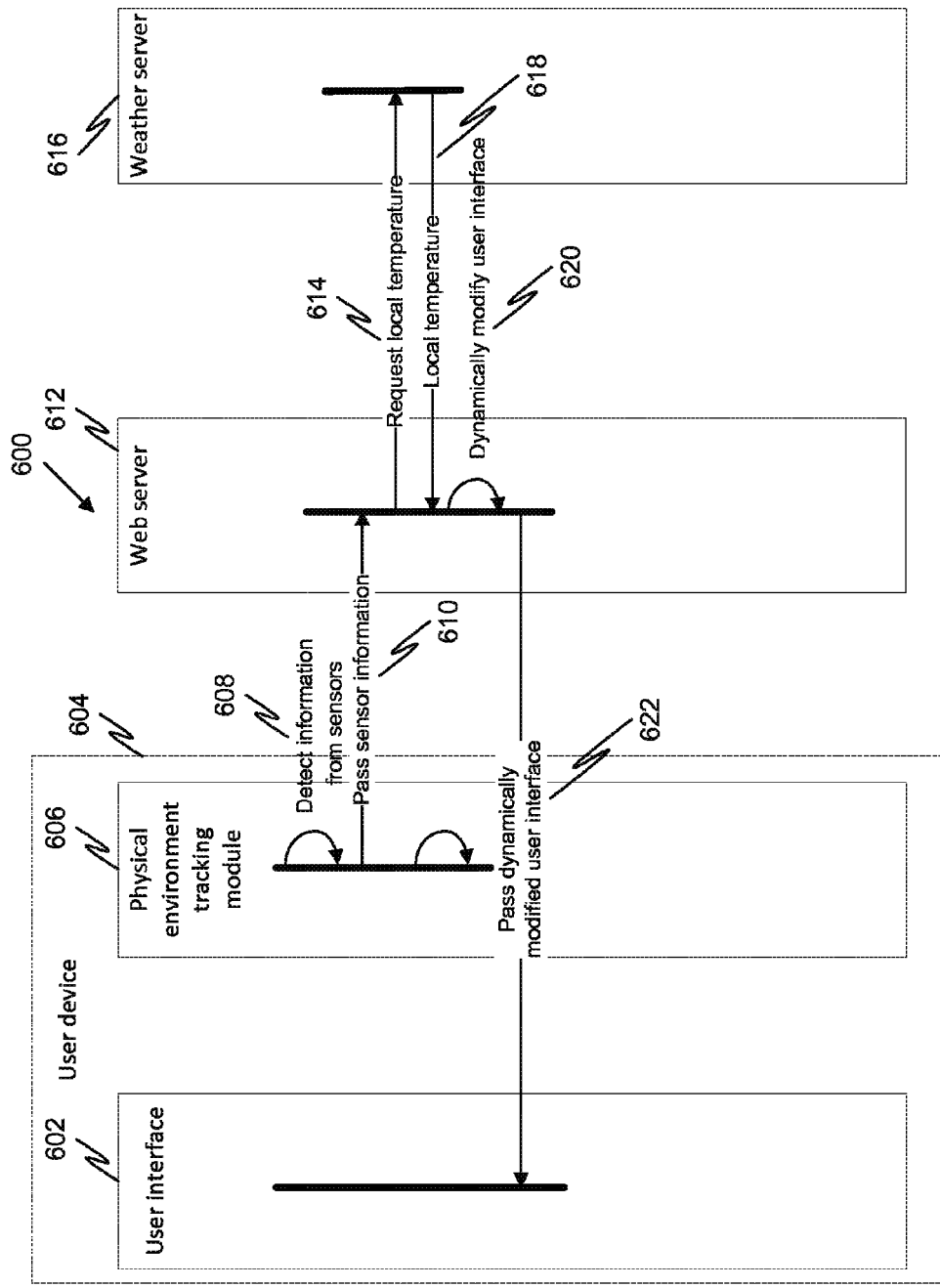
FIG. 6 is an interaction diagram illustrating a method, in accordance with an example embodiment, of dynamically altering a user interface.

FIG. 6 is an interaction diagram illustrating a method 600, in accordance with an example embodiment, of dynamically altering a user interface. In this method 600, a user interface 602 is located on a user device 604, along with a physical environment tracking module 606. At operation 608, the physical environment tracking module 606 detects information from sensors on the user device 604. At operation 610, this information is passed to a web server 612. At operation 614, the web server 612 requests a local temperature from the weather server 616, using the sensor information. At operation 618, the weather server 616 returns the local temperature, which the web server 612 uses at operation 620 to dynamically modify user interface 602. At operation 622, the web server 612 passes the dynamically modified user interface to the user interface 602 for display.

Figure 7:
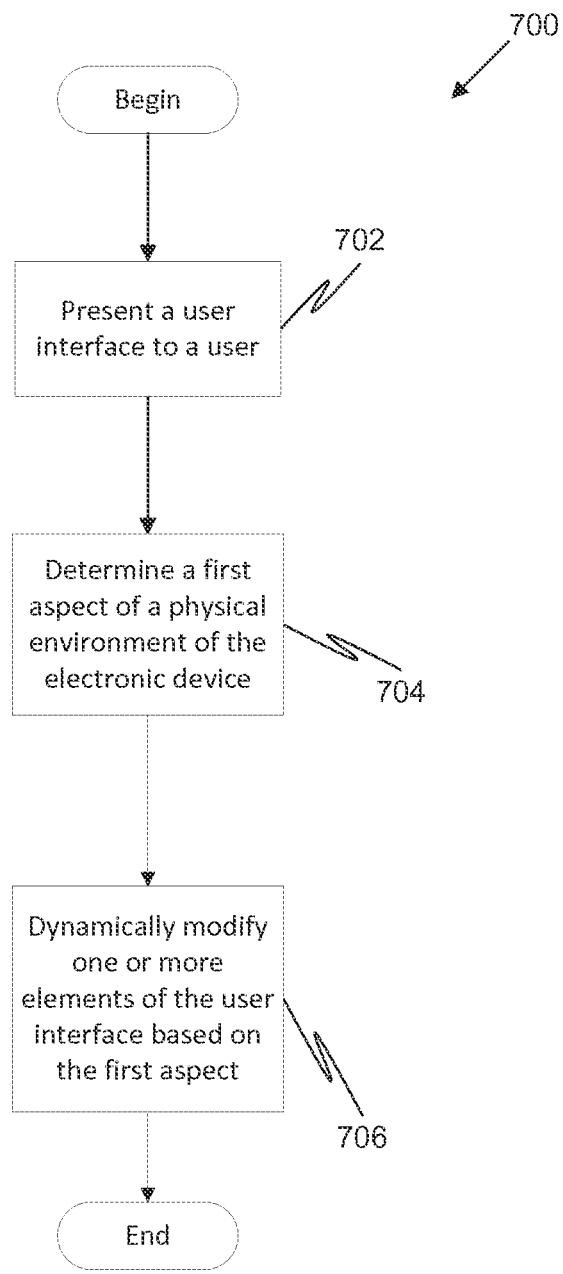
FIG. 7 is a flow diagram illustrating a method, in accordance with an example embodiment, of dynamically altering a user interface.

FIG. 7 is a flow diagram illustrating a method 700, in accordance with an example embodiment, of dynamically altering a user interface. At operation 702, a user. interface is presented to a user. At operation 704, a first aspect of a physical environment of the electronic device is determined. An aspect of a physical environment may be any feature of the physical environment, such as temperature, rain patterns, snow conditions, allergy conditions, sun position, etc. At operation 706, one or more of the elements of the user interface are dynamically modified based on the first aspect.

Figure 8:
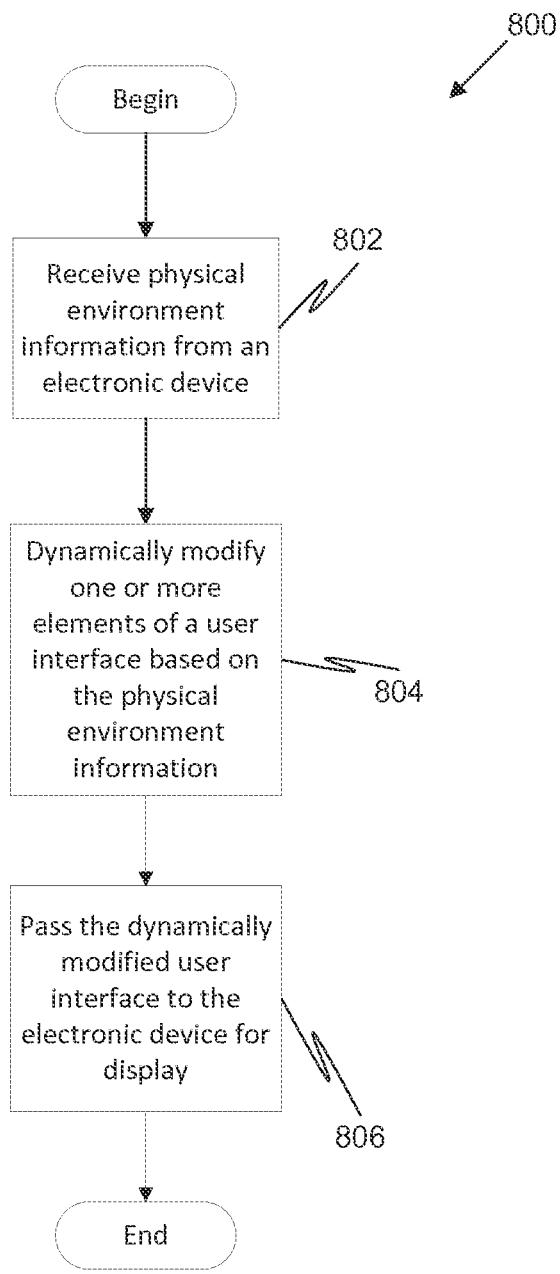
FIG. 8 is a flow diagram illustrating a method, in accordance with another example embodiment, of dynamically altering a user interface.

FIG. 8 is a flow diagram illustrating a method 800, in accordance with another example embodiment, of dynamically altering a user interface. At operation 802, physical environment information is received from an electronic device. At operation 804, one or more of the elements of the user interface are dynamically modified based on the physical environment information. At operation 806, the dynamically modified user interface is passed to the electronic device for display.

Figure 9:
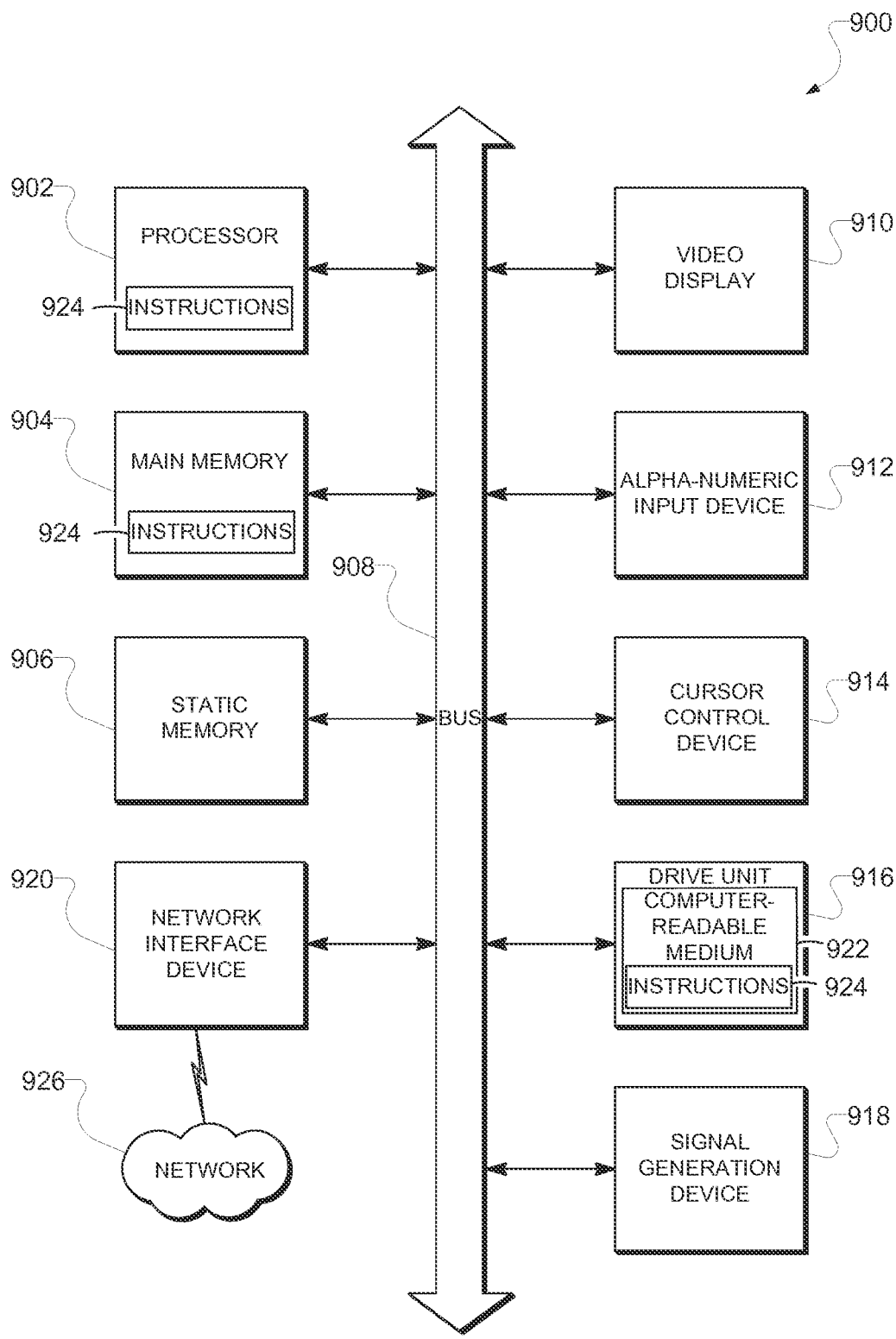
FIG. 9 shows a diagrammatic representation of a machine in the example form of a computer system within which a set of instructions for causing the machine to perform any one or more of the methodologies discussed herein may be executed.

FIG. 9 shows a diagrammatic representation of a machine in the example form of a computer system 900 within which a set of instructions 924 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker), and a network interface device 920.

The disk drive unit 916 includes a computer-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media. The instructions 924 may further be transmitted or received over a network 926 via the network interface device 920.

While the machine readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding or carrying a set of instructions for execution by the machine and that cause the machine to perform any one or more of the methodologies described herein. The term. "machine-readable medium" shall accordingly be taken to include, but not be limited to, solid-state memories, optical and magnetic media, and carrier wave signals.

Although the inventive concepts have been described with reference to specific example embodiments, it will be evident that various modifications and changes may be made to these embodiments without departing from the broader spirit and scope of the inventive concepts. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. An electronic device, comprising:
a processor;
a touchscreen;
a user interface configured to present one or more elements on the touchscreen of the electronic device; and
a physical environment tracking module configured to determine a first aspect of a physical environment, other than location or current time, of the electronic device and to dynamically modify one or more of the one or more elements based on the determined first aspect of the physical environment of the electronic device, the physical environment tracking module further configured to alter a mode of the touchscreen such that a touchscreen interface operating on the touchscreen changes from a first mode in which touchscreen input is received without providing tactile feedback to a second mode in which tactile feedback is provided through the touchscreen by generating vibrations on the touchscreen in response to touch input based on the determined first aspect of the physical environment.

2. The electronic device of claim 1, further comprising a thermometer, and wherein the physical environment tracking module is configured to obtain temperature information from the thermometer.

3. The electronic device of claim 1, further comprising one or more hardware buttons, wherein the physical environment tracking module is configured to dynamically alter a mapping of one or more physical buttons on the electronic device to activate one or more elements of the user interface.

4. The electronic device of claim 3, wherein the one or more of the elements dynamically modified include a virtual button.

5. A method of dynamically altering a user interface on an electronic device, the method comprising:
presenting a user interface to a user via a touchscreen on the electronic device, the user interface including one or more elements;
determining a first aspect of a physical environment, other than location, of the electronic device;
dynamically modifying one or more elements of the user interface based on the determined first aspect of the physical environment of the electronic device; and
altering a mode of the touchscreen such that a touchscreen interface operating on the touchscreen changes from a first mode in which touchscreen input is received without providing tactile feedback to a second mode in which tactile feedback is provided through the touchscreen by generating vibrations on the touchscreen in response to touch input based on the determined first aspect of the physical environment.

6. The method of claim 5, wherein the first aspect of the physical environment is ambient temperature.

7. The method of claim 6, wherein the dynamically modifying includes increasing a size of the one or more elements as the ambient temperature decreases.

8. The method of claim 6, wherein the dynamically modifying includes dynamically engaging a voice-recognition system on the electronic device as the ambient temperature decreases.

9. The method of claim 5, wherein the dynamically modifying includes dynamically altering a mapping of one or more physical buttons on the electronic device to activate the one or more elements of the user interface.

10. The method of claim 6, further comprising causing the electronic device to heat itself at an increased rate as the ambient temperature decreases.

11. The method of claim 10, wherein the causing includes cycling a central processing unit (CPU) of the electronic device so that the CPU is utilized at a maximum rate.

12. The method of claim 10, wherein the causing includes increasing a brightness level of a display of the electronic device.

13. The method of claim 5, wherein the dynamically modifying includes activating a haptic mode to provide tactile feedback upon activation of the one or more elements of the user interface.

14. A method of dynamically altering a user interface on an electronic device, the method comprising:
receiving physical environment information from the electronic device;
dynamically modifying one or more elements of a user interface based on the physical environment information;
transmitting the dynamically modified user interface to the electronic device for display on a touchscreen; and
altering a mode of the touchscreen such that a touchscreen interface operating on the touchscreen changes from a first mode in which touchscreen input is received without providing tactile feedback to a second mode in which tactile feedback is provided through the touchscreen by generating vibrations on the touchscreen in response to touch input based on physical environment information.

15. The method of claim 14, wherein the method is performed at a web server communicatively coupled to the electronic device.

16. The method of claim 14, wherein the physical environment information includes ambient temperature.

17. The method of claim 4, wherein the physical environment information includes rain patterns.

* * * * *

UNITED STATES PATENT AND TRADEMARK OFFICE
CERTIFICATE OF CORRECTION

PATENT NO. : 9,501,201 B2
APPLICATION NO. : 13/769499
DATED : November 22, 2016
INVENTOR(S) : Higgins et al.

It is certified that error appears in the above-identified patent and that said Letters Patent is hereby corrected as shown below:

In the Claims

In Column 8, Line 65, in Claim 17, delete "claim 4," and insert --claim 14,--, therefor Signed and Sealed this
First Day of May, 2018

Andrei Iancu
*Director of the United States Patent and Trademark Office*